April 5, 1938.  D. C. ROWE  2,113,000
ANTIFLUTTER DEVICE
Filed May 17, 1933
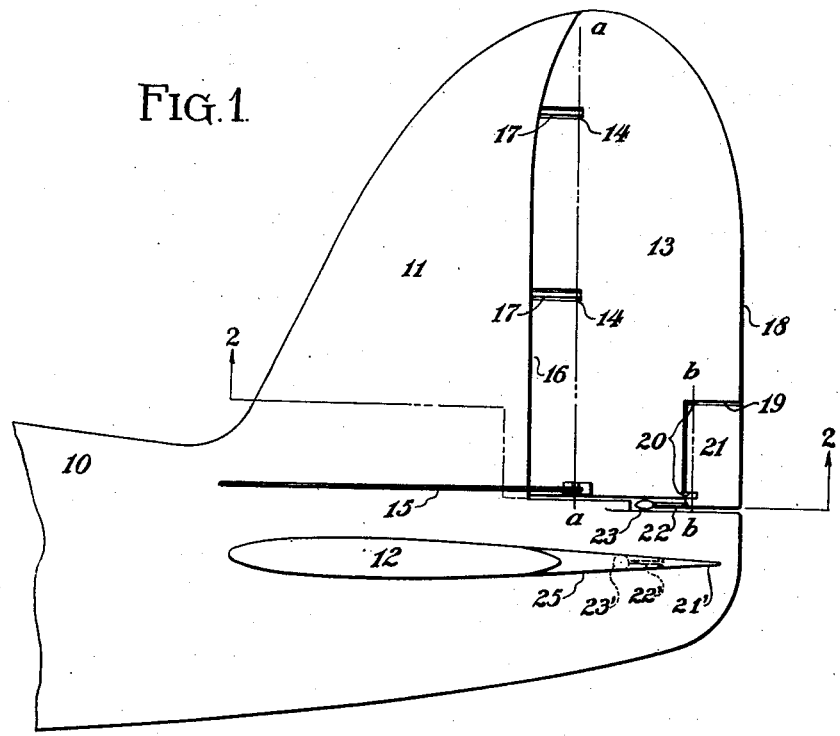
FIG.1.
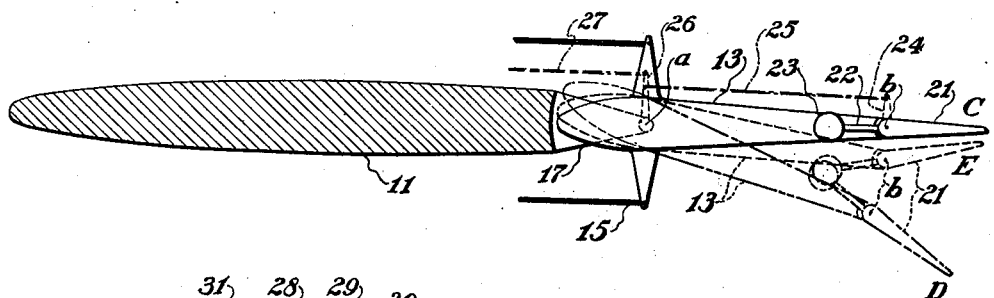
FIG.2.
FIG.3.
FIG.4.
INVENTOR.
DONALD C. ROWE.
BY
ATTORNEYS.

Patented Apr. 5, 1938

2,113,000

UNITED STATES PATENT OFFICE 2,113,000

ANTIFLUTTER DEVICE

Donald C. Rowe, Kenmore, N. Y., assignor, by mesne assignments, to Curtiss-Wright Corporation, a corporation of New York Application May 17, 1933, Serial No. 671,470

17 Claims. (Cl. 244—75)

This invention relates to aircraft, and particularly to means for overcoming inadvertent flutter in control surfaces thereof.

In the recent development of high speed aircraft, a phenomenon commonly known as "flutter" has sometimes appeared in the control airfoils, such as ailerons, rudder and/or elevators. The effect of flutter is to impose severe stresses on the aircraft structure with possible failure resulting, and may also have the effect of impairing the controllability of the aircraft. The basic reasons for the phenomenon have not been fully determined, but certain curative practices have been evolved which, when applied, appear to assist in eliminating flutter. Some of these practices include lightening the affected parts, locating the center of gravity of a control airfoil forward of its pivot axis, and eliminating slack and lost motion in the airfoil hinges and actuating members.

The subject invention provides fully automatic means for damping and eliminating control airfoil flutter, and comprises briefly an auxiliary airfoil hinged to the control airfoil rearwardly of the control airfoil pivot. The auxiliary airfoil is arranged with its center of gravity forward of its hinge axis, and with its center of pressure rearward thereof, which, in action, provides damping moments for the control airfoil in a manner to be more fully described hereinafter.

A somewhat similar and related phenomenon to control surface flutter is the vibration in flight of exposed brace wires and long exposed struts. The invention also provides means for damping vibration in such members.

Objects of the invention are to provide means for eliminating control airfoil flutter; to provide a freely swingable auxiliary airfoil hinged to a control airfoil; to provide a hinged airfoil having its center of gravity forward of the hinge axis; to provide a hinged airfoil having the major part of its air contacting surface rearward of its hinge axis; and to provide an airfoil which by its inertia, tends to damp fluttering tendencies. Related objects are to provide auxiliary airfoils, either fixed to or hinged to other aircraft members which may be subject to vibration or flutter, to damp and eliminate such vibration or flutter. In such auxiliary airfoils, the principles are identical with the airfoils as applied to control surfaces; namely, the center of gravity of the airfoil is ahead of the member, or ahead of the point of attachment of the airfoil, while the center of pressure is rearward thereof.

Further objects will be apparent in reading the annexed specification and claims, and in considering the drawing, in which similar numbers designate similar parts, and in which:

Fig. 1 is a side elevation of the empennage of an airplane embodying the invention, Fig. 2 is an enlarged section on the line 2—2 of Fig. 1, showing, in dotted lines, certain of the elements in different positions of adjustment, Fig. 3 is a cross section through a brace wire having an auxiliary airfoil attached thereto, and Fig. 4 is a cross section through a streamline strut having an auxiliary airfoil attached thereto.

Describing the invention in detail, 10 is an airplane fuselage having a vertical fin 11, and a horizontal stabilizer 12. At the trailing edge of the fin 11, a rudder 13 is pivoted, as at 14, for swinging movement subject to the action of conventional rudder controls 15. The line $a$—$a$ designates the rudder pivot axis, which may be rearward of the leading edge 16 of the rudder, or may be at any other convenient location with respect to said leading edge. Suitable brackets 17, attached to the fin 11, carry the rudder pivots.

Toward the trailing edge 18 of the rudder 13, a cutout 19 is made, and hinges 20 are arranged on an axis $b$—$b$ to carry an auxiliary airfoil 21. Said airfoil 21 extends rearwardly from the hinge axis $b$—$b$, and is freely swingable to either side of the plane of symmetry of the rudder 13. It will be noted that, since the bulk of the surface of the airfoil 21 is rearward of the axis $b$—$b$, the center of pressure of air acting thereon will likewise be rearward of said axis. To place the center of gravity of the structure of the airfoil 21 forward of said hinge axis $b$—$b$, an arm 22, carrying a weight 23 at its forward end, extends forwardly of the axis $b$—$b$, and is rigidly attached to the airfoil 21. Alternative means will be apparent to those skilled in the art for carrying the center of gravity of the airfoil 21 forward of the hinge axis $b$—$b$.

The operation of the device may be more readily understood by referring to Fig. 2. The position C shows the rudder 13 and the auxiliary airfoil 21 in alinement, which would be their normal position. Should the rudder begin to flutter, that is, be moved by forces other than those imposed by the pilot of the aircraft on the controls 15, it will move quickly to some displaced position such as D. When this occurs, the surface of the auxiliary airfoil 21 will tend to be displaced at a greater angle than the rudder, due to the weight of said airfoil acting forward of the axis $b$—$b$, which weight, by inertia, resists displacement.

Hence, the airfoil 21, addressed by the air stream, exerts a steering effect on the rudder 13, tending to move it back to the plane of symmetry or to position C. As such movement occurs, the rudder 13 and airfoil 21 will assume a position such as E, wherein the rudder is moving toward the plane of symmetry, but the airfoil 21 has, by its inertia, moved in opposite angular sense to the rudder, since the center of gravity thereof is forward of its hinge axis. Hence, the air stream then acts on the opposite side of the airfoil 21, counteracting in some degree the restoring turning moment initiated in position D, thus damping movement of both the rudder 13 and the airfoil 21, preventing repetitious oscillation of either, and gradually returning both to their positions in the aircraft plane of symmetry.

The proportionate size, weight, center of gravity location and center of pressure location of the airfoil 21 will govern its effectiveness in damping flutter oscillation. The above functional description is predicated upon correct proportions in the device, which proportions may be evolved by calculation and experiment. It will be readily appreciated that the structure and functions above described may be applied with identical effect to elevators, ailerons, brace wires, struts or other movable aircraft members. In Fig. 1 the elevator 25, carried by the stabilizer 12, for instance, may be equipped with an auxiliary airfoil 21'; an arm 22' and a weight 23', to act in the same manner as the similar elements 21, 22 and 23.

The airfoil 21 as above described, may be either freely swingable to fulfill an anti-flutter function only, or may be controllable. Fig. 2 shows, in dotted lines, one arrangement for controlling the airfoil 21, wherein a horn 24, fixed to the airfoil, is connected by the rod 25 to a lever 26, movable on the axis a—a. This lever may in turn be controlled by a rod 27 leading to the pilot's quarters, whereby the pilot may set the airfoil 21 at an angle with respect to the rudder 13 for trimming yawing tendencies in the flight of the aircraft. Whether controllable or freely swingable, the airfoil 21 will have the desired effect in controlling flutter. When controllable, the control elements, as 24, 25, 26 and 27 will have sufficient resilience to allow the airfoil 21 to move sufficiently to damp flutter.

Figs. 3 and 4 show the anti-flutter or anti-vibration devices as they may be applied to streamline brace wires or struts. In Fig. 3, a wire 28 has attached thereto a small airfoil 29 having a main portion 30 of light material extending principally rearwardly of the wire 28, so that its center of surface area is rearward of the wire. A nose 31 of heavier material forms the forward portion of the airfoil 29, whereby the center of gravity of the unit is thrown forward of the center of the wire 28. If the wire starts to move crosswise of the airstream, the nose 31 lags by inertia, tilting the airfoil 29 and twisting the wire 28 to steer the unit to a neutral position. In Fig. 4, the element 28' may represent a strut or the like which is relatively rigid and not subject to twist. Here, the airfoil 29' is swivelled on the strut as at 32, so that, as the element 28' moves crosswise, the airfoil 29' will turn about the swivel 32, by the inertia of the nose 31', and steer the strut 28' back to a neutral position.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft having a control airfoil movable about a pivot, an auxiliary airfoil freely movable about a hinge carried on said control airfoil, said auxiliary airfoil having its center of gravity forward of its hinge and its center of pressure rearward thereof.

2. In aircraft having a control airfoil controllably movable with respect thereto, an auxiliary airfoil hinged toward the rearward edge of said control airfoil movable with and with respect thereto, having its center of gravity forward of said hinge and its center of pressure rearward of said hinge.

3. In aircraft having a control airfoil subject to controlled movement, means for overcoming uncontrolled flutter of said airfoil comprising a statically unbalanced auxiliary airfoil hinged to said control airfoil having its center of gravity forward of said hinge and its center of pressure rearward thereof.

4. In aircraft, a control airfoil pivoted thereto and extending rearwardly from the pivot, an auxiliary airfoil hinged toward its forward edge to said control airfoil, the hinge axis being spaced rearwardly from said pivot, and an arm extending from said auxiliary airfoil forward of said hinge, the mass of said arm being of a magnitude to more than counterbalance the weight of said auxiliary airfoil rearward of said hinge.

5. In aircraft, a vertical rudder pivoted thereto, and an auxiliary airfoil hinged to said rudder rearwardly of said rudder pivot for free swinging with respect thereto, said airfoil having its center of gravity forward of said hinge and its center of pressure rearward of said hinge.

6. In aircraft, an elevator pivoted thereto and an auxiliary airfoil hinged to said elevator rearwardly of said elevator pivot for free swinging with respect thereto, said airfoil having its center of gravity forward of said hinge, and its center of pressure rearward of said hinge.

7. In aircraft having a member subject to both controlled and uncontrolled relative movement in flight, an auxiliary airfoil for damping the uncontrolled movement attached to said member, said airfoil having its center of pressure rearward of its point of attachment, and having means forward of said point of attachment for locating the center of gravity of said airfoil forward of said point of attachment.

8. In aircraft having a member subject to both controlled and uncontrolled relative movement in flight, means for damping the uncontrolled movement comprising an element attached thereto intermediate the width of said element, said element having its aerodynamic center of pressure rearward of said point of attachment, and having a mass forward of said point of attachment greater than the mass rearward thereof.

9. In aircraft, a movable element in the slipstream, and an auxiliary airfoil embracing said element having its aerodynamic center of pressure rearward of its point of attachment to said element, and having means for establishing the center of gravity thereof forward of said point of attachment.

10. In aircraft, an auxiliary airfoil, and a movable member in the slipstream embraced by and attached to said airfoil, said airfoil having its center of pressure rearward of the point of attachment and having its center of gravity forward thereof.

11. In aircraft having a member subject to uncontrolled relative movement in flight, an auxiliary airfoil for damping said movement controlled in its own movement only by its response to airflow and inertia, pivoted to swing freely on and with respect to said member, said airfoil having its center of pressure rearward of said pivot, and having its center of gravity forward of said pivot.

12. In an aircraft element exposed to the airstream and subject to movement about an axis of oscillation, flutter prevention means comprising an auxiliary control surface carried by said element, said surface having its center of pressure rearward of the oscillation axis of said element, and having its center of gravity forward of said oscillation axis.

13. In a relatively long slender aircraft element exposed to the airstream, means for preventing inadvertent flutter thereof, comprising an auxiliary airfoil carried by said element, said airfoil having its center of gravity forward of the center of gravity of said element, and having its center of pressure rearward of the center of gravity of said element.

14. In an aircraft element subject to controlled movement, means for preventing flutter thereof, comprising an auxiliary airfoil carried thereby and disposed in the airstream, said airfoil being hinged to said element and having its center of gravity forward of the hinge line, and its center of pressure rearward thereof.

15. In means for overcoming flutter in an aircraft element subject to controlled movement, an auxiliary airfoil mounted for oscillation on said element, said airfoil having its center of mass forward of the axis of oscillation, and having its center of pressure rearward of said axis of oscillation.

16. In aircraft, an airfoil subject to controlled movement, an auxiliary anti-flutter airfoil hinged to said controlled airfoil, the center of gravity of said auxiliary airfoil being forward of said hinge and the center of pressure thereof being rearward of said hinge.

17. In aircraft, a control airfoil pivoted thereto, and an auxiliary airfoil hinged to said control airfoil rearwardly of said control airfoil pivot for free swinging movement with respect to the control airfoil, said auxiliary airfoil having its center of gravity forward of said hinge and its center of pressure rearward of said hinge.

DONALD C. ROWE.